United States Patent [19]
Aizawa et al.
[11] 3,873,922
[45] Mar. 25, 1975

[54] TELEVISION TUNER HAVING MEANS FOR GENERATING AFT AND AGC VOLTAGES AS WELL AS AN AUDIO SIGNAL

[75] Inventors: Hideo Aizawa, Furukawa; Torao Morimoto, Soma, both of Japan

[73] Assignee: Alps Electric Co., Ltd., Tokyo, Japan

[22] Filed: Jan. 2, 1974

[21] Appl. No.: 430,152

[52] U.S. Cl. .............. 325/422, 178/5.8 AF, 334/16
[51] Int. Cl. .......................... H04n 5/50, H04b 1/28
[58] Field of Search ........... 325/327, 418, 420, 422; 138/5.8 AF; 330/30 R; 334/16, 26

[56] References Cited

UNITED STATES PATENTS

| | | | |
|---|---|---|---|
| 2,162,883 | 6/1939 | Foster | 325/422 |
| 2,528,222 | 10/1950 | Foster | 325/327 |
| 2,553,368 | 5/1951 | Green | 178/5.8 AF |
| 3,209,164 | 9/1965 | DeWitt | 330/30 R |

OTHER PUBLICATIONS

RCA Linear Integrated Circuits, 1970, pp. 265, 270, 271.

*Primary Examiner*—George H. Libman

[57] ABSTRACT

The television tuner includes a mixer which separates the video IF carrier signal or sound IF signal from the IF television signal. The mixer comprises a cascode amplifier wherein the second storage has separate transistors to amplify the IF television and separated signals independently. Means are provided for detecting the separated signal and generating an AFT voltage in accordance with frequency variations therein. An AGC voltage is also derived from this detecting means in accordance with the magnitude of the received signal. If the sound IF signal is selected for separation, direct detection of the sound signal is possible. Additional means may be provided for a second conversion of the sound IF signal to further lower the IF frequency to expand the detection range and thus reduce distortion. In this manner, AFT, AGC and audio detection functions may take place within the tuner itself without any external connections, thereby eliminating problems associated with characteristic mismatching between components.

9 Claims, 9 Drawing Figures

FIG. 7
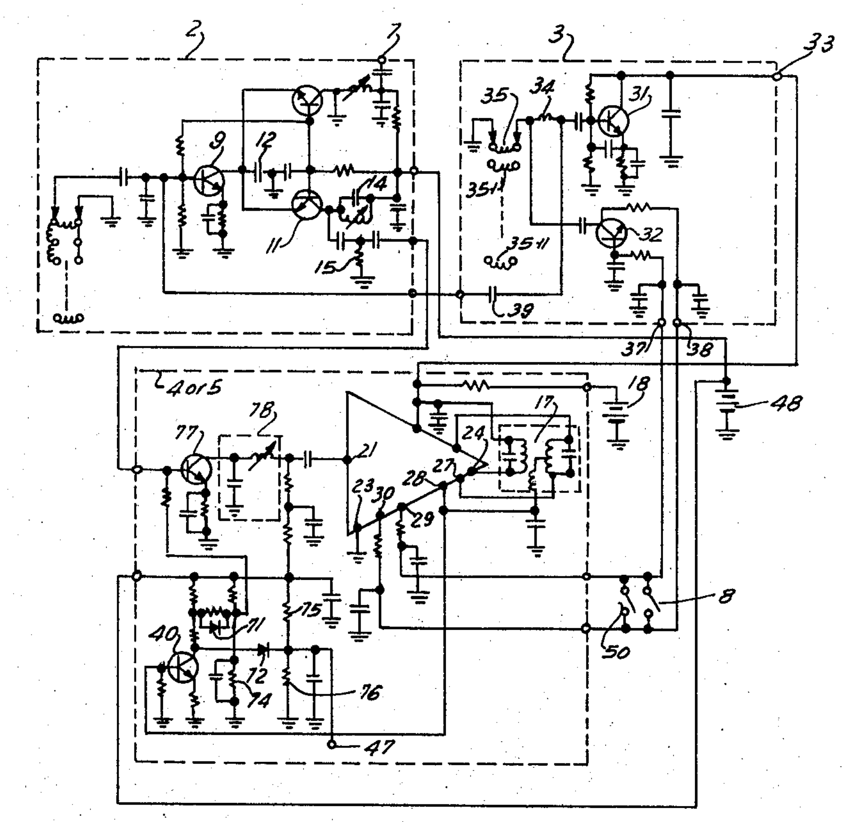
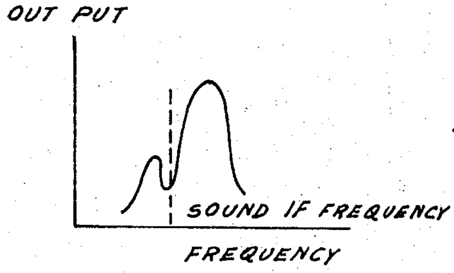
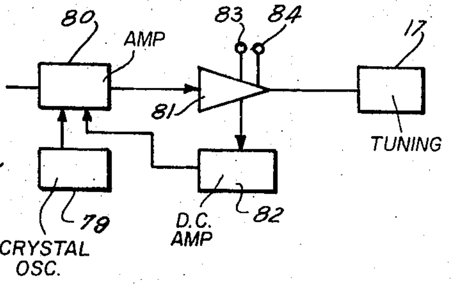
FIG. 8 FIG. 9

TELEVISION TUNER HAVING MEANS FOR GENERATING AFT AND AGC VOLTAGES AS WELL AS AN AUDIO SIGNAL

The present invention relates to television tuners and particularly to a television tuner having automatic oscillation frequency tuning and automatic gain control.

It is the function of a television tuner to select a single frequency from among the many broadcast frequencies in the radio frequency band. A conventional television tuner performs this function through the use of a radio frequency amplifier, a mixer and a local oscillator. However, because of the presence of variations in external factors, such as temperature and humidity, the local oscillation frequency may be disturbed, thereby causing a drift in the tuned frequency and a reduction in reception quality. In order to overcome this problem, conventional tuners are provided with means for compensating for variations in these external factors such that the oscillation frequency is stabilized.

This is normally accomplished by deriving an automatic oscillation frequency tuning voltage (AFT) from the output of the intermediate frequency amplifying stage of the tuner and then supplying this voltage to the appropriate control terminal of the tuner. This automatic oscillation frequency tuning voltage is representative of frequency variations in the tuner output and is utilized to regulate the frequency of the local oscillator.

In a similar manner, the magnitude of the received signal may vary due to external factors. Thus, conventional television tuners are often provided with means for automatically controlling the gain of the tuner such that the magnitude of the tuner output signal is held at a constant level. In order to accomplish this, a second feedback voltage, called the automatic gain control voltage (AGC), is derived from the output of the intermediate frequency amplifying stage of the tuner and then supplied to the appropriate control terminal in the tuner. This automatic gain control voltage serves to continuously regulate the radio frequency amplifier such that the gain of the tuner output is held at a constant level.

In order to accomplish the automatic oscillation frequency tuning function and the automatic gain control function in the manner utilized in a conventional tuner, it is necessary to provide a plurality of coupling interconnections between the tuner itself and various other portions of the receiver. Because of these many interconnections, it is often difficult to correct any mismatching in characteristics which occur between components. Since the mismatching of characteristics between the tuner and other components of the receiver may adversely affect the reception, it is desirable to provide a television tuner which performs these functions in a manner which eliminates the necessity for these interconnections and therefore eliminates the need for precisely matching the electrical characteristics of the tuner to other components of the receiver.

It is, therefore, a prime object of the present invention to provide a television tuner which is capable of performing the automatic oscillation frequency tuning and automatic gain control functions in an independent manner, thereby eliminating interconnections between the tuner and other portions of the receiver.

It is another object of the present invention to provide a television tuner having means for separating a signal component necessary for the derivation of the automatic oscillation frequency tuning voltage and automatic gain control voltage and having an IC device capable of detecting both of these voltages.

It is a further object of the present invention to provide a television tuner incorporating means for detecting an audio signal in addition to the automatic oscillation frequency tuning and automatic gain control voltages.

In accordance with the present invention, a television tuner including a radio frequency amplifier, a local oscillator and means for mixing the outputs of the amplifier and the oscillator are provided. The mixing means comprises a cascode amplifier wherein a component of the IF television signal is separated and amplified independently. The separated signal is detected in an integrated circuit which generates an automatic oscillation frequency tuning voltage representative of the frequency variations in the local oscillator. This AFT voltage is then used in controlling the output of the local oscillator. An automatic gain control voltage is also derived from the detecting circuit and used to stabilize the gain of the radio frequency amplifier.

The separated signal may be the video IF carrier signal or the sound IF signal. If the sound IF signal is selected, the audio portion of the broadcast may be directly derived therefrom. However, in one preferred embodiment, a second heterodyne conversion is performed on the sound IF signal to lower the frequency thereof such that distortion is reduced.

In order to accomplish the separation function, the mixer has a pair of cascoded amplifier stages. The first stage is comprised of a single transistor and the second stage of two separate transistors operated in a common base mode. Each of the transistors in the second stage is operably connected to a separate filter means. One of the filter means passes the IF television signal to the IF amplifier and the other separates a portion of the IF television signal for derivation of the AFT and AGC voltages. Thus the AFT and AGC voltages are generated by the tuner itself, eliminating problems of matching of characteristics between components. In addition, if the sound IF signal is selected for separation, the audio portion of the broadcast may also be derived.

To the accomplishment of the above, and to such other aspects as may hereinafter appear, the present invention relates to a television tuner having self-contained automatic oscillation frequency tuning and automatic gain control functions as defined in the appended claims and as described in the specification, taken together with the accompanying drawings wherein like numerals refer to like parts and in which:

FIG. 7 is a schematic diagram of selected portions of a second preferred embodiment of the present invention;

FIG. 8 is a graphical representation of the audio intermediate frequency characteristics of the embodiment of FIG. 7; and FIG. 9 is a block diagram of a third preferred embodiment of the present invention;

Figure 1:
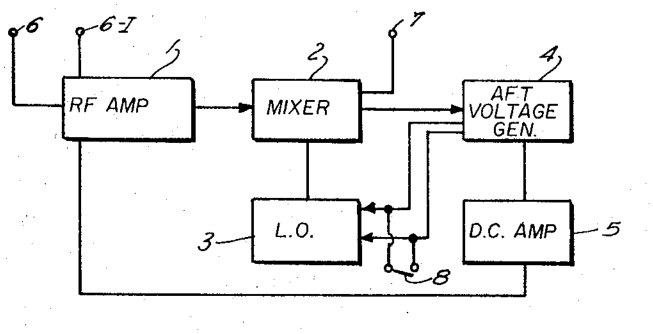
FIG. 1 is a block diagram of the tuner of the present invention.

FIG. 1 shows a block diagram of the basic circuit components of the television tuner according to the present invention. A radio frequency amplifier 1 is provided with an antenna input terminal 6 and a UHF tuner input terminal 6–1. Radio frequency amplifier 1 amplifies the input signals from these terminals and generates an output to the first input terminal of mixer 2. The second input terminal of mixer 2 receives the output generated by a local oscillator 3. Mixer 2 has two output terminals, an IF television signal output terminal 7 which is connected to the IF amplifier stage of the television receiver (not shown) and a second output terminal which is coupled to an automatic oscillation frequency tuning voltage generator 4. The automatic oscillation frequency tuner generator 4 supplies the AFT voltage to the control terminal of local oscillator 3 through an external switch 8 which, when closed, permits the tuner to operate without the AFT function. AFT voltage generator 4 also derives the automatic gain control voltage which is fed to the input terminal of a DC amplifier 5. The output of the DC amplifier 5 is coupled to the gain control terminal of radio frequency amplifier 1.

In operation, the television signal transmitted through antenna terminal 6 is amplified by radio frequency amplifier 1 and then supplied to mixer 2 together with the output signal of local oscillator 3. Mixer 2 performs a heterodyne conversion and produces an intermediate frequency television signal which is transmitted to the intermediate frequency amplifier stage of the receiver through intermediate frequency television signal output terminal 7. Mixer 2 also separates and independently amplifies a portion of the television IF signal which may be the video intermediate frequency carrier signal or the sound IF signal. This separated signal is supplied to automatic oscillation frequency tuning voltage generator 4. The automatic oscillation frequency tuning voltage generator 4 generates an AFT voltage which is related to the frequency variation of the separated signal. This AFT voltage is fed back to the control terminal of oscillator 3 in order to stabilize the oscillation frequency of the tuner (as is well known) and thereby eliminate the effects of variations of external factors which disturb oscillation.

Automatic oscillation frequency tuning voltage generator 4 also derives an automatic gain control voltage, which is related to the magnitude of the received television signal. This AGC voltage is amplified at DC amplifier 5 and then applied to the control terminal of radio frequency amplifier 1 in order to control the gain thereof. Because the AGC function is performed within the tuner itself, this voltage may be used to reduce variations in the signal applied to the detector diodes of automatic oscillation frequency tuning voltage generator 4 to further minimize variations in tuning frequency.

Figure 2:
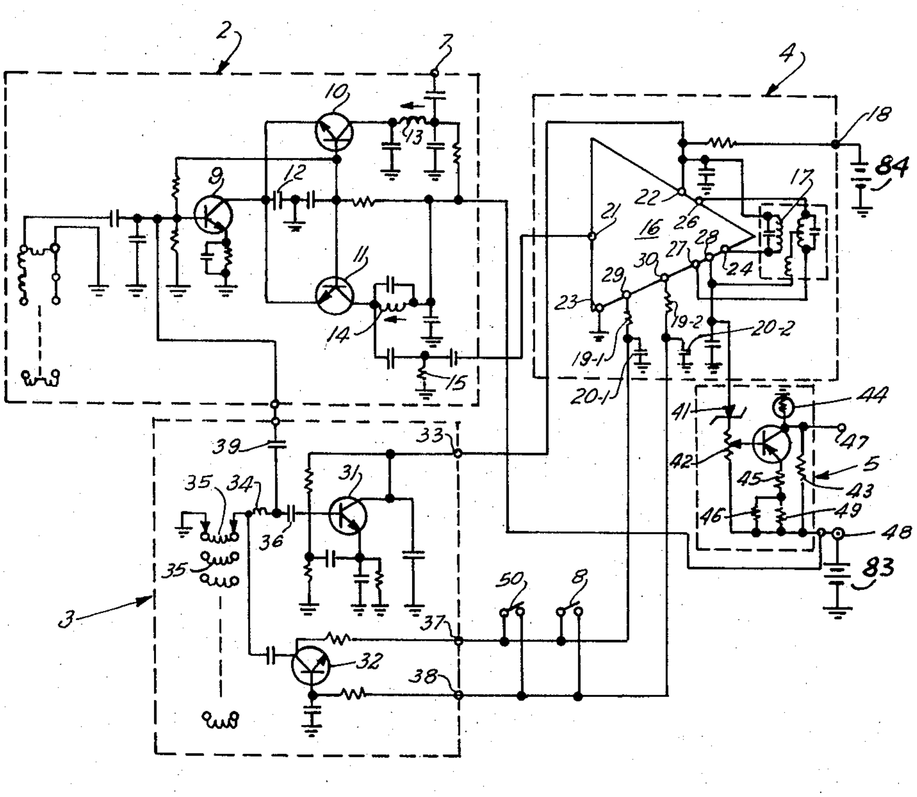
FIG. 2 is a schematic diagram of selected portions of a first preferred embodiment of the present invention.

FIG. 2 shows a schematic diagram of the mixer 2, local oscillator 3, automatic oscillation frequency tuning voltage generator 4 and the DC amplifier 5 of FIG. 1. A radio frequency television signal corresponding to the desired television channel is received at the antenna (not shown) and selected from the other broadcast television signals by means of a channel selector which may take the form of a turret type or a switch type channel selector. The selected signal is then amplified in radio frequency amplifier 1 and supplied to the base of the first stage of transistor 9 in mixer 2. The output signal of local oscillator 3 is also coupled to the base of transistor 9 through a coupling capacitor 39 to enable mixer 2 to perform the heterodyne conversion operation. Transistors 10 and 11 form the second stage of mixer 2. The emitter of each of the transistors 10 and 11 is connected to the collector of transistor 9. Although this circuit has a construction similar to that of a differential amplifier, it performs a mixing function by means of two cascode amplifying stages, the first of which has a single transistor 9 and the second of which has a pair of transistors 10 and 11 operated in a common base mode. A capacitor 12 connected between the collector of transistor 9 and ground serves as a bypass capacitor for the local oscillation frequency and further serves as a resonant capacitor forming a resonant circuit tuned to the IF frequency in cooperation with the inductive input admittance of each of the transistors 10 and 11 caused by the common mode of operation of these transistors. The value of the capacity of capacitor 12 is preferably in the order of tens of picofarads.

Transistor 10 serves as an amplifier for the television IF signal and the output thereof is fed to filter circuit 13 which serves as a portion of stagger tuning circuit. The output of circuit 13 is coupled to the intermediate frequency amplifying stage (not shown) of the receiver through output terminal 7. Transistor 11 serves as an amplifier and the output thereof is fed to a tank circuit 14 which passes only a selected portion of the television IF signal. The portion of the signal which circuit 14 passes is, of course, dependent upon the resonant frequency thereof. In accordance with the present invention, this separated portion is either the video IF carrier signal or the sound IF signal. A resistor 15 is utilized in conjunction with tank circuit 14 for impedance matching. The separated signal is then supplied to input terminal 21 of integrated circuit device 16 which acts as an FM detector and forms the heart of the automatic oscillation frequency tuning voltage generator 4.

Normally, the intermediate frequency amplifier stage of the receiver is constructed as a stagger tuning circuit and the center frequency of each amplifier step is different from that of the others. If the separated signal is the video IF carrier signal, it is possible to set the resonant frequency of filter circuit 13 at a lower value than the video intermediate frequency carrier so as to avoid obstructions caused by the coupling between filter 13 and tank circuit 14.

Figure 3:
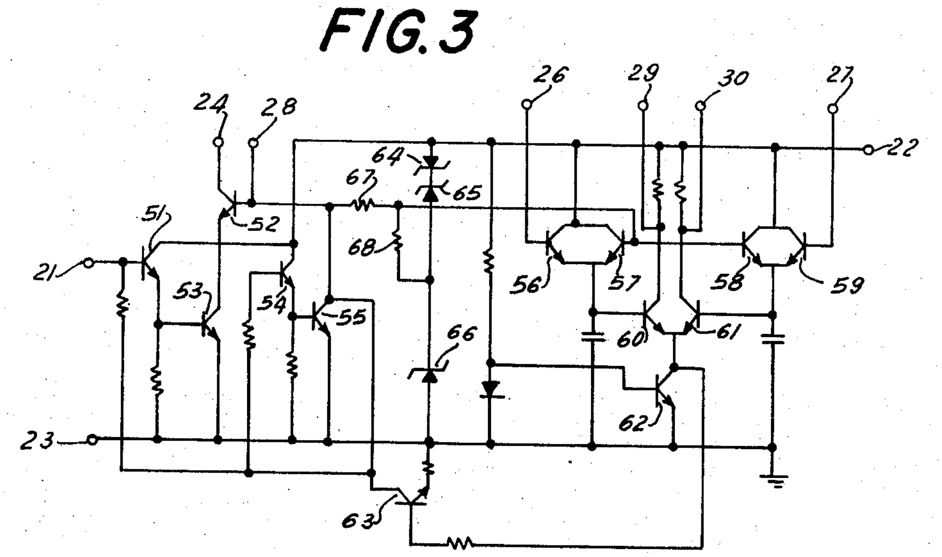
FIG. 3 is a circuit diagram of the detection circuit utilized in the present invention for generating the automatic oscillation frequency tuning voltage.
Figures 4, 5, 6:
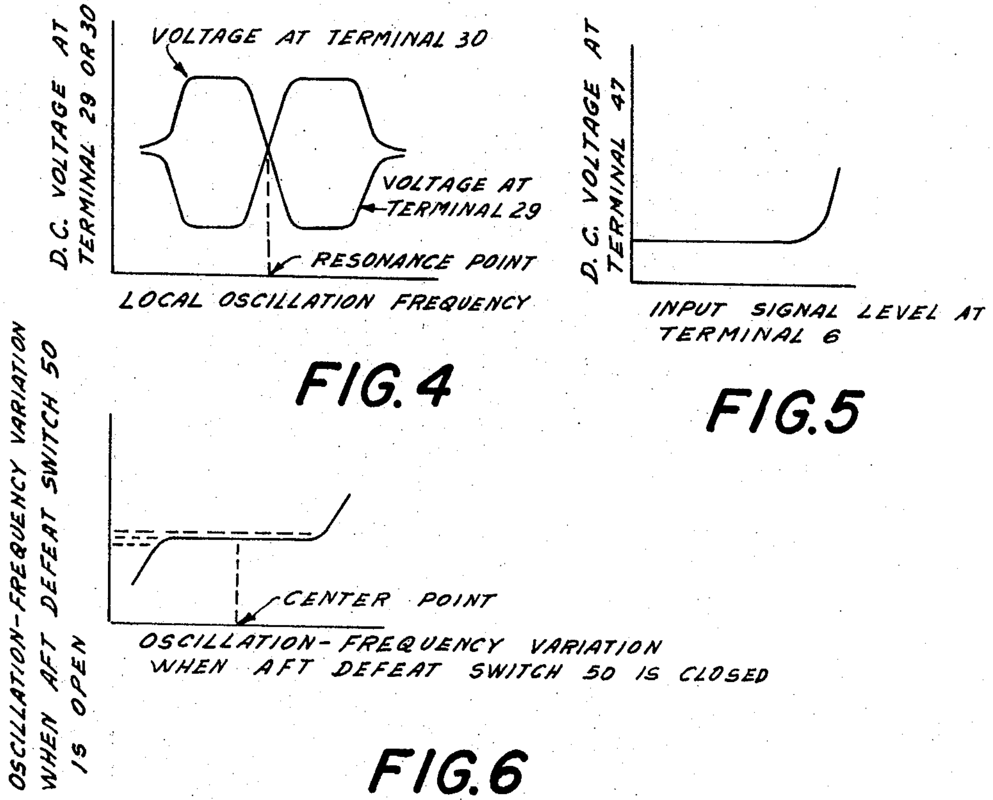
FIG. 4 is a graphical representation of the output of the circuit of FIG. 3.
FIG. 5 is a graphical representation showing the relationship between automatic gain control voltage and the signal received at the input of the radio frequency amplifier.
FIG. 6 is a graphical representation of the oscillation frequency variations when the automatic oscillation frequency tuning function is being utilized and when it is not being utilized.

FIG. 3 shows a schematic diagram of a conventional integrated circuit device which may be used to derive the AFT voltage. Such a device is commercially available and the circuit shown in FIG. 3 is equivalent to that of an integrated circuit produced by Radio Corporation of America as CA3064 or Motorola Incorporated as MC1364. Because the circuit shown in FIG. 3 is a commercially available component, its operation will be only briefly described such that the function thereof can be fully appreciated in conjunction with the circuit shown in FIG. 2. The separated signal from tank circuit 14 is supplied to input terminal 21 and then amplified by direct coupling amplifiers 51, 52, 53, 54 and 55. The collector of transistor 52 is connected to a discriminator transformer 17 through output terminal 24. The secondary winding output of transformer 17 is coupled to transistors 56 and 59 through terminals 26 and 27 respectively. The signals from terminals 26 and 27 are detected by the diode function between the base and emitter of transistors 56 and 59, respectively. The outputs of transistors 56 and 59 are amplified by transistors 60 and 61 respectively, and the collectors of transistors 60 and 61 are connected to output terminals 29 and 30 respectively. The signals which appear on terminals 29 and 30 are DC voltages both of which are used as AFT voltages in the well-known manner. These voltages have characteristics as shown in FIG. 4. If the signals at terminals 26 and 27 are increased, the voltage at the collector of transistor 62 is likewise increased. An increase of the voltage at the collector transistor 62 causes an increase in the voltage drop across resistors 67 and 68 through the amplification supplied by transistor 63. This voltage drop results in an automatic gain control effect on transistors 51, 52, 56 and 59.

The AFT voltages obtained at terminals 29 and 30 of IC device 16 are coupled to a transistor 32 in oscillator 3 which acts as a variable capacity diode to control the frequency of the local oscillation. The AFT voltage at terminal 30 is supplied to the base of transistor 32 and the AFT voltage at terminal 29 is supplied to the collector of transistor 32. In the event that the frequency of the local oscillation is varied due to external factors, for example temperature or humidity, the capacity of the variable diode is controlled so as to bring the oscillation frequency back to a predetermined value. In this manner, the automatic oscillation frequency tuning function is performed.

The AGC voltage obtained at terminal 28 of integrated circuit device 16 is stepped up by means of a series connection with Zener diode 41 and a semifixed resistance 42. This voltage is thereafter amplified by transistor 40. Resistors 45, 46 and 49 are connected to the emitter of transistor 40. A thermistor 44 is connected to the collector of transistor 40. When the DC voltage at terminal 28 decreases, the emitter current of transistor 40 is increased and so is the current flowing through thermistor 44. As the current flowing through thermistor 44 increases, thermistor 44 generates more heat thus causing the resistance thereof to decrease. This causes the AGC voltage appearing at terminal 47 to have a delayed automatic gain control characteristic. This delayed automatic gain control characteristic is shown in the graph of FIG. 5. The voltage at terminal 47 is supplied to a control terminal of radio frequency amplifier 1 and may serve to perform the forward automatic gain control operation in the case wherein a bipolar type transistor is utilized in radio frequency amplifier 1 to control the output thereof. Accordingly, it is possible to control the gain of the tuner without deterioration of the noise figure and, since the input level of discriminator transformer 17 is stabilized, it is possible to keep the oscillation frequency stable even during variations of the received signal level. As a result, the output at terminal 7 is stabilized against magnitude variations in the received television signal and there is a virtual decrease in gain difference among channels.

As can be seen in FIG. 2, a switch 50 is provided for eliminating the AFT function when it is in the closed position such that the adjustment of tuning circuits, fine tuning or channel selecting may be performed in the absence of this function. This switch is provided in addition to external switch 8. The graph of FIG. 6 shows variations of the oscillation frequency between times when switch 50 (or switch 8) is in the open and closed positions. According to experiment, the automatic oscillation frequency tuning function operated stably if the television signal level exceeded 50 db/m. In this instance, the changes in oscillation frequency were controlled within the range of ±50kHz. Such control is required for receiving a color television signal and can be maintained even if the oscillation frequency changes by as much as ±1MHz.

A second preferred embodiment of the present invention is illustrated in FIG. 7. This embodiment works in a manner similar to the embodiment previously described with the exception that an additional amplifying stage is provided between mixer 2 and integrated circuit device 16 so that the operating range of the AFT may be expanded. The separated signal from tank circuit 14 of mixer 2 is supplied to transistor 77 which further amplifies this signal before it is supplied to input terminal 21 of IC device 16. A filter circuit 78 is interposed between the collector of transistor 77 and terminal 21. The AGC voltage present at terminal 28 of IC device 16 is amplified by DC amplifier 40 in a manner similar to that shown in FIG. 2 and then converted into the delayed automatic gain control voltage by means of diodes 71 and 72 and resistors 73, 74, 75 and 76. The delayed automatic gain control voltage is then supplied to the base of transistor 77. This delayed automatic gain control voltage is also supplied to radio frequency amplifier 1 through output terminal 47.

It will be apparent that for preventing noise figure deterioration, it is preferable to have the automatic gain control function on transistor 77 at the initiation thereof, and thereafter on radio frequency amplifier 1. According to experiment, the tuner according to the second preferred embodiment of the present invention showed satisfactorily stable performances in the range of television signal levels from 30 to 100 db/m.

The present invention provides a television tuner which has self-contained AFT and AGC functions, thereby eliminating many of the interconnections between the tuner and other components of the receiver. In this way, any mismatching of the characteristics between these components is eliminated. Further, since it is possible, with the present invention, to compensate for variations in the characteristics of every amplifier element in the circuit, the tuner of the present invention is capable of generating a stable and uniform output. Furthermore, since the AFT function is provided in the tuner, the oscillation frequency is stabilized. It is, however, possible to operate the tuner without the AFT function if necessary, by closing external switch 8 which is provided in parallel to switch 50. This is particularly convenient in situations where the receiver is operated in a weak reception area or wherein adjacent channels are of extremely high power.

In the case where the tuner of the present invention is used as a VHF tuner, it may be combined with a UHF tuner and used as a portion of the intermediate frequency amplifier stage. The output of the UHF tuner is coupled to terminal 6–1 and terminals 37 and 38 are connected to the AFT control terminal of the UHF tuner, with a switch similar to switch 50 interposed therebetween such that the automatic oscillation frequency tuning function can be eliminated in the UHF tuner when desired. If a radio frequency amplifier is provided in the UHF tuner which is composed of active elements similar to the radio frequency amplifier for the VHF tuner, it will be possible for both the UHF tuner and the VHF tuner to have the same automatic gain control functions by coupling the output generated at terminal 47 to the automatic gain control input terminal of the UHF tuner.

A battery 83 provides a DC voltage to node 48 which is connected to radio frequency amplifier 1. A battery 84 is connected to node 18 of automatic oscillation frequency tuner voltage generator 4 which supplies a DC voltage to IC device 16 at node 22 and to local oscillator 3 through node 33. The use of separate batteries 83 and 84, instead of connecting node 33 of local oscillator 3 to node 48 (and therefore to mixer 2) permits the output of the tuner to be further stabilized. In the IC device 16, shown in FIG. 3, Zener diodes 64, 65 and 66 are provided between terminals 22 and 23 such that a common battery source 84 can be utilized by local oscillator 3 as well as by IC device 16 without adversely affecting the stabilized output of the tuner.

In the embodiment shown in FIG. 7, the resonant frequency of tuning circuits 14, 17 and 78 may be set to the sound IF signal (for example, 54.25MHz) and if the Q value of tuning circuit 14 is made as large as possible, the output taken from terminal 7 will have a frequency characteristic which eliminates sound IF frequency therefrom as shown in FIG. 8. Thus, a trap is provided at the input of the intermediate frequency amplifier stage in order to prevent the video signal from being affected by the sound signal. In conventional tuners, such a sound trap must be provided by additional components. Furthermore, the output obtained at terminal 29 or 30 is proportional to the variation of local oscillation within the range of about ±100kHz in the vicinity of the resonant point, as shown in FIG. 4. Since the television broadcast sound signal has a maximum frequency deviation of ±25kHz, this proportional range is enough to serve for FM detection of the audio signal. In other words, the output obtained at terminals 29 or 30 may be directly detected to serve as the audio signal output. In this regard, the additional amplifying stage is particularly important because the sound IF signal is normally of lower magnitude than the remainder of the received signal.

FIG. 9 shows a block diagram of additional circuitry to be used in conjunction with the previously described circuitry to form a third preferred embodiment of the present invention. In this embodiment, audio signals may be produced by an additional heterodyne conversion. A crystal oscillator 79 is provided, the oscillation output of which is supplied to an amplifier 80. Amplifier 80 acts as an intermediate frequency amplifier and also serves to mix the oscillation output with the sound IF signal. The output of amplifier 80 is a second IF signal having a lower frequency. This lower frequency signal is fed to IC device 81 which performs a function similar to the above-described IC device 16. For example, if the oscillation frequency of the crystal oscillator 79 is set at 49.75 MHz and the sound IF signal is at 54.25 MHz, the second intermediate frequency signal is 4.5 MHz. IC device 81 is operated at this lower frequency, so that it is possible to increase the gain of IC device 81 to a preferred level. The AGC voltage generated by IC device 81 is amplified by DC amplifier 82 and then fed back to amplifier 80 and, in addition, to the appropriate control terminals in the above-described circuit.

The advantage produced by the circuit shown in FIG. 9 can be shown by a comparison between the ratios of the maximum frequency deviation to the sound IF frequency when the audio signal is detected directly from the sound IF signal and where the embodiment of FIG. 9 is used. Where the audio is detected directly from the sound IF signal, the ratio of the maximum frequency deviation to the sound IF frequency = (0.025/54.25) or $4.61 \times 10^{-4}$. In the case where the circuitry shown in FIG. 9 is utilized, the ratio of the maximum frequency deviation to the sound IF frequency = (0.025/4.5) or $5.56 \times 10^{-3}$. Therefore, it can be seen that this ratio is increased by about ten times so that it is possible to substantially reduce undesirable effects due to the deviations in the resonant frequency of tuning circuit 17. Since the linear range of FM detection is expanded, it will be also possible to reduce distortion of the detected audio signal caused by color mismatching of the reproduced color image.

Even though the above description has been given in association with a coil select type tuner, it will be apparent that this invention may be used with a variable capacitor type tuner in an entirely analogous manner and without any loss of desirable effect. Further, although several preferred embodiments of the present invention have been specifically disclosed herein for purposes of illustration, it is apparent that many modifications and variations may be made upon the specific structures and circuits disclosed. It is intended to cover all of these variations and modifications which fall within the scope of this invention as defined by the appended claims.

We claim:

1. A television receiver comprising a tuner having a radio frequency amplifier, a local oscillator and means for mixing the outputs of said amplifier and said oscillator to form an IF television signal; and intermediate frequency amplification and processing stages connected to said mixing means, said mixing means having means for separating a frequency component of said IF television signal from said signal proper prior to the transfer of said IF television signal to said intermediate frequency amplification and processing stages, means for detecting said separated component and generating a first voltage representative of frequency variations in said IF television signal, and means for controlling the output of said local oscillator in accordance with said first voltage to stabilize the oscillation frequency thereof.

2. The receiver of claim 1 further comprising means operably connected to said detecting means to generate a second voltage representative of the magnitude of said separated signal, and means for controlling the gain of said radio frequency amplifier in accordance with said second voltage.

3. The receiver of claim 1 wherein said separated component of said IF television signal is the video IF carrier signal.

4. The receiver of claim 1 wherein said separated component is the sound IF signal.

5. In the receiver of claim 4, means for deriving an audio signal from said sound IF signal.

6. The receiver of claim 4 further comprising means for lowering the frequency of said sound IF signal and means for detecting said lower frequency sound IF signal and deriving an audio signal therefrom.

7. The receiver of claim 1 wherein said mixing means comprises a cascode amplifier with a last stage comprising two transistors, a pair of filter circuits, a different one of which is connected to the output of each of said transistors such that said television IF signal and said separated signal are separately generated and amplified.

8. The receiver of claim 7 wherein each of said filter circuits are set at a different frequency.

9. The receiver of claim 1 wherein the power source for said detection means is also used to power said local oscillator.

* * * * *